(12) United States Patent
Usuda et al.

(10) Patent No.: US 12,015,179 B2
(45) Date of Patent: Jun. 18, 2024

(54) FUEL CELL SYSTEM

(71) Applicant: NISSAN MOTOR CO., LTD., Yokohama (JP)

(72) Inventors: Masahiro Usuda, Kanagawa (JP); Susumu Maeshima, Kanagawa (JP); Tomokatsu Himeno, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/774,949

(22) PCT Filed: Nov. 7, 2019

(86) PCT No.: PCT/IB2019/001246
§ 371 (c)(1),
(2) Date: May 6, 2022

(87) PCT Pub. No.: WO2021/090041
PCT Pub. Date: May 14, 2021

(65) Prior Publication Data
US 2022/0399552 A1    Dec. 15, 2022

(51) Int. Cl.
*H01M 8/04014* (2016.01)
*H01M 8/0612* (2016.01)
*H01M 8/0662* (2016.01)
*H01M 8/12* (2016.01)

(52) U.S. Cl.
CPC ..... *H01M 8/04022* (2013.01); *H01M 8/0618* (2013.01); *H01M 8/0662* (2013.01); *H01M 2008/1293* (2013.01)

(58) Field of Classification Search
None
See application file for complete search history.

(56) References Cited

U.S. PATENT DOCUMENTS

| | | | |
|---|---|---|---|
| 6,077,620 A | 6/2000 | Pettit | |
| 2006/0127719 A1* | 6/2006 | Brantley | H01M 8/04268 429/442 |
| 2006/0134470 A1* | 6/2006 | Kaye | H01M 8/0612 429/430 |
| 2022/0320534 A1* | 10/2022 | Usuda | H01M 8/0643 |

FOREIGN PATENT DOCUMENTS

| | | |
|---|---|---|
| JP | H01-239773 A | 9/1989 |
| JP | 11-176461 A | 7/1999 |
| JP | 2015-207510 A | 11/2015 |

* cited by examiner

*Primary Examiner* — Haroon S. Sheikh
(74) *Attorney, Agent, or Firm* — Foley & Lardner LLP

(57) ABSTRACT

A fuel cell system includes a fuel cell configured to generate electricity by receiving a working gas, a combustor configured to combust an off-gas discharged from the fuel cell, a heat exchange device configured to supply the working gas to the fuel cell, and perform heat exchange with a discharged gas from the combustor, and a manifold disposed between the fuel cell and the combustor, and between the fuel cell and the heat exchange device. The manifold includes an off-gas flow path along which the off-gas discharged from the fuel cell is guided to the combustor and a discharged gas flow path along which the discharged gas discharged from the combustor is guided to the heat exchange device.

12 Claims, 10 Drawing Sheets

FUEL CELL SYSTEM

TECHNICAL FIELD

The present invention relates to a fuel cell system.

BACKGROUND ART

JP H11-176461A discloses a fuel cell device including a fuel cell that generates electricity by using hydrogen supplied from a reformed gas stream and oxygen supplied from an oxidant stream.

SUMMARY OF INVENTION

The fuel cell device further includes a fuel reformer configured to supply a reformed gas, that is obtained by reforming methanol, to a reformed gas stream, a combustor configured to combust a gas or the like discharged from the fuel cell, and a heat exchanger configured to heat the fuel reformer using the discharged gas discharged from the combustor. The fuel reformer, the combustor, and the heat exchanger are connected to the fuel cell and the like via various pipes. Since a large number of pipes are used in such a fuel cell device, there is a problem that the fuel cell device is increased in size.

Therefore, an object of the present invention is to provide a fuel cell system having a compact configuration.

According to an aspect of the present invention, a fuel cell system including a fuel cell configured to generate electricity by receiving a working gas is provided. The fuel cell system includes a combustor configured to combust an off-gas discharged from the fuel cell, a heat exchange device configured to supply the working gas to the fuel cell, and perform heat exchange with a discharged gas from the combustor, and a manifold disposed between the fuel cell and the combustor, and between the fuel cell and the heat exchange device. The manifold includes an off-gas flow path along which the off-gas discharged from the fuel cell is guided to the combustor and a discharged gas flow path along which the discharged gas discharged from the combustor is guided to the heat exchange device.

DESCRIPTION OF EMBODIMENTS

Hereinafter, an embodiment of the present invention is described with reference to the drawings.

Figure 1:
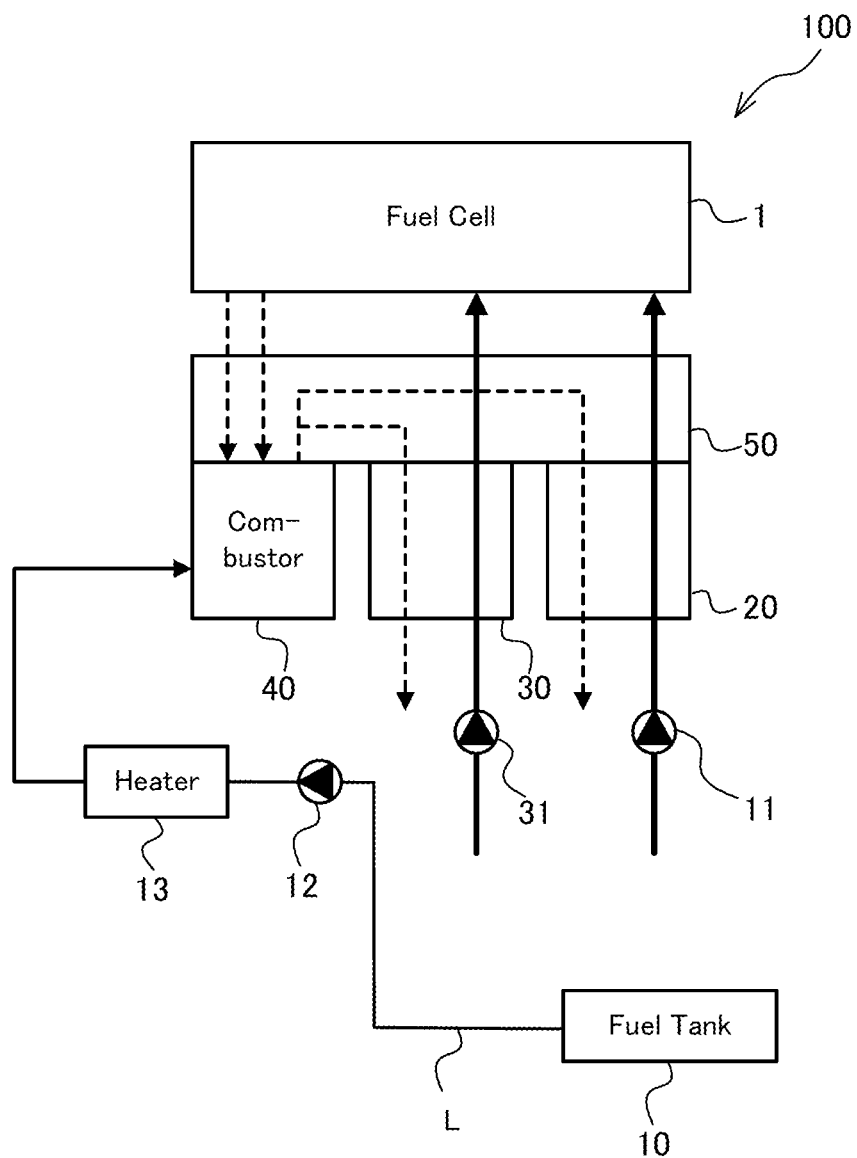
FIG. 1 is a schematic view of a fuel cell system according to an embodiment.

FIG. 1 is a schematic view of a fuel cell system 100 according to an embodiment of the present invention.

The fuel cell system 100 shown in FIG. 1 is, for example, an in-vehicle fuel cell system. The fuel cell system 100 includes a fuel cell stack 1, and a fuel tank 10 that stores a raw fuel used for electricity generation of the fuel cell stack 1. Further, the fuel cell system 100 includes a reformer 20 that reforms the raw fuel into an anode gas, an air heat exchanger 30 that heats air as a cathode gas, a discharged gas combustor 40 that combusts an off-gas discharged from the fuel cell stack 1, and a manifold 50 that guides the anode gas, the cathode gas, the off-gas, and the like to various devices.

The fuel cell stack 1 is a fuel cell laminate that generates electricity by receiving a working gas (an anode gas and a cathode gas). The electricity generated by the fuel cell stack 1 is used to charge a battery or the like mounted on a hybrid vehicle. The fuel cell stack 1 is configured by laminating a plurality of fuel cells, and each fuel cell as an electricity generation source is, for example, a solid oxide fuel cell (SOFC).

The fuel tank 10 stores the raw fuel necessary for generating the anode gas to be supplied to the fuel cell stack 1 or generating a combustion gas to be used for warming up system components and the like. The raw fuel is, for example, a liquid fuel containing water and ethanol (hydrous ethanol containing 40% by volume of ethanol). The liquid fuel is not limited to the hydrous ethanol, and may be a liquid fuel containing gasoline, methanol, or the like.

The raw fuel stored in the fuel tank 10 is supplied to the reformer 20 via a first injector 11, and is reformed into an anode gas in the reformer 20. The anode gas generated by the reformer 20 is supplied to the fuel cell stack 1 through the manifold 50.

Meanwhile, air supplied to the air heat exchanger 30 by an air blower 31 is heated by the air heat exchanger 30. The air as the heated cathode gas is supplied to the fuel cell stack 1 through the manifold 50.

The fuel cell stack 1 generates electricity by receiving the anode gas as a fuel gas and the cathode gas as an oxidant gas. The anode gas and the cathode gas that are not used during electricity generation are discharged from the fuel cell stack 1 as an anode off-gas and a cathode off-gas, respectively. These off-gases are supplied to the discharged gas combustor 40 through the manifold 50, and combusted in the discharged gas combustor 40.

The off-gas combusted in the discharged gas combustor 40 is supplied to the reformer 20 and the air heat exchanger 30 as a high-temperature discharged gas (combustion gas) through the manifold 50. The discharged gas supplied to the reformer 20 is used for heat exchange with a reforming catalyst provided in the reformer 20, and then discharged to the outside. Further, the discharged gas supplied to the air heat exchanger 30 is used for heat exchange with the cathode gas passing through the air heat exchanger 30, and then discharged to the outside. In this way, the reformer 20 and the air heat exchanger 30 are configured as heat exchange devices that exchange heat using the heat of the discharged gas discharged from the discharged gas combustor 40.

The fuel cell system 100 further includes a fuel supply line L along which the raw fuel can be directly supplied to the discharged gas combustor 40 in order to warm up devices constituting the system when the system is started. The fuel supply line L is provided with a second injector 12, and the raw fuel injected from the second injector 12 is heated by a heater 13 and then supplied to the discharged gas combustor 40. At the time of starting or the like, the discharged gas combustor 40 combusts the raw fuel heated by the heater 13. The combustion gas (discharged gas) combusted by the discharged gas combustor 40 is used for warming up the reformer 20 and the air heat exchanger 30.

Figure 2A:
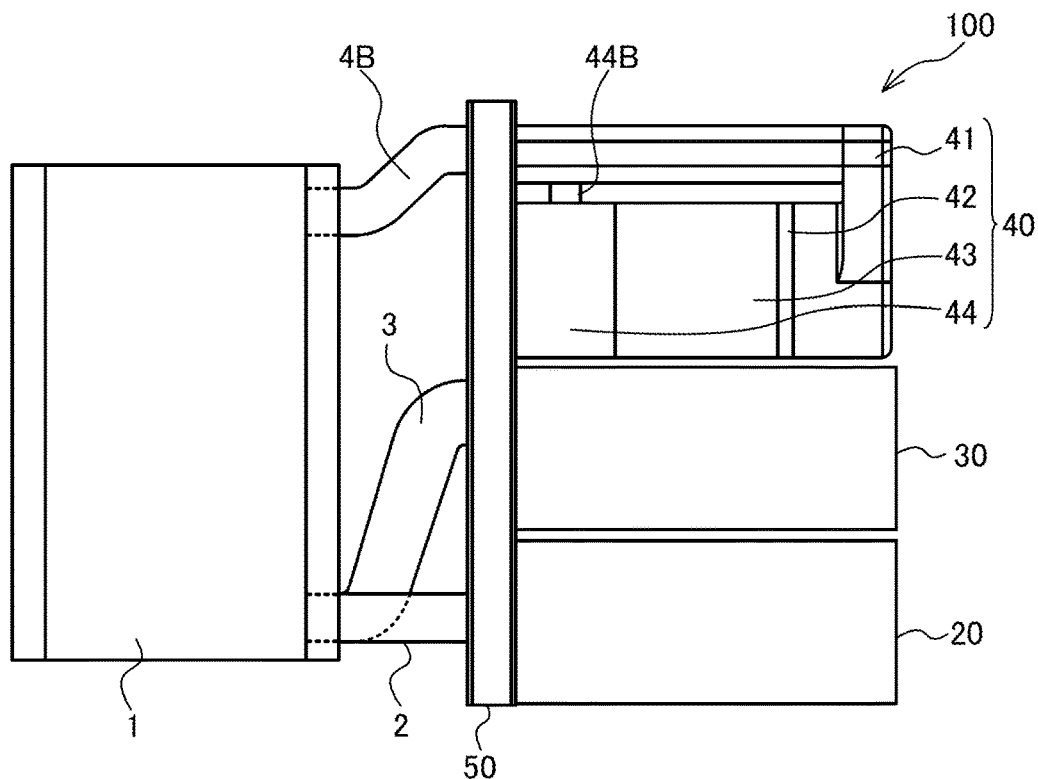
FIG. 2A is a plan view of the fuel cell system according to the embodiment.
Figure 2B:
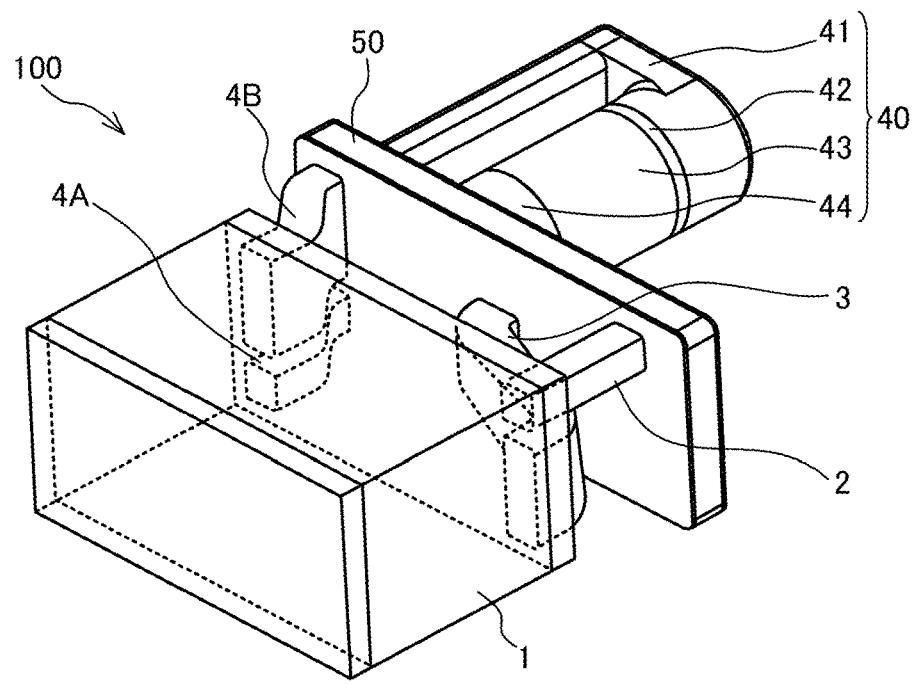
FIG. 2B is a perspective view of the fuel cell system according to the embodiment.

A configuration of the fuel cell system 100 is further described with reference to FIGS. 2A and 2B. FIG. 2A is a plan view of the fuel cell system according to the present embodiment, and FIG. 2B is a perspective view of the fuel cell system according to the present embodiment. In FIG. 2B, some of the system components such as the reformer are omitted.

As shown in FIGS. 2A and 2B, in the fuel cell system 100, the manifold 50 is disposed between the fuel cell stack 1 and the heat exchange device such as the reformer 20, and between the fuel cell stack 1 and the discharged gas combustor 40. The reformer 20, the air heat exchanger 30, the discharged gas combustor 40, and the manifold 50 are integrally formed. More specifically, the manifold 50 is configured as a substantially rectangular thin plate-shaped member, and the reformer 20, the air heat exchanger 30, and the discharged gas combustor 40 are connected to a manifold end surface on an opposite side of the fuel cell stack 1 so as to be in contact with the manifold end surface. The reformer 20, the air heat exchanger 30, and the discharged gas combustor 40 are arranged adjacently along a width direction of the fuel cell stack 1 while being connected to the manifold 50. The reformer 20 and the discharged gas combustor 40 are located on outer sides in the width direction, and the air heat exchanger 30 is located between the reformer 20 and the discharged gas combustor 40.

Meanwhile, the manifold 50 is connected to the fuel cell stack 1 via an anode gas supply pipe 2, a cathode gas supply pipe 3, an anode off-gas discharge pipe 4A, and a cathode off-gas discharge pipe 4B.

The anode gas supply pipe 2 connects a front surface of the fuel cell stack 1 and a manifold end surface on a fuel cell stack side, and supplies the anode gas passing through the manifold 50 to the fuel cell stack 1. The cathode gas supply pipe 3 connects the front surface of the fuel cell stack 1 and the manifold end surface on the fuel cell stack side, and is disposed below the anode gas supply pipe 2. The cathode gas supply pipe 3 supplies the cathode gas passing through the manifold 50 to the fuel cell stack 1.

The cathode off-gas discharge pipe 4B connects the front surface of the fuel cell stack 1 and the manifold end surface on the fuel cell stack side, and supplies the cathode off-gas discharged from the fuel cell stack 1 to the manifold 50. The anode off-gas discharge pipe 4A connects the front surface of the fuel cell stack 1 and the manifold end surface on the fuel cell stack side, and is disposed below the cathode off-gas discharge pipe 4B. The anode off-gas discharge pipe 4A supplies the anode off-gas discharged from the fuel cell stack 1 to the manifold 50.

In the fuel cell system 100 according to the present embodiment, the fuel cell stack 1 and the manifold 50 are configured to be connected by four pipes 2, 3, 4A, and 4B, but these pipes may be omitted, and the fuel cell stack 1 and the manifold 50 may be disposed adjacent to each other. When the fuel cell stack 1 and the manifold 50 are brought into contact with each other so as to be adjacent to each other, a contact surface of both the fuel cell stack 1 and the manifold 50 is formed with a plurality of gas passage holes through which various gases pass.

Figure 3:
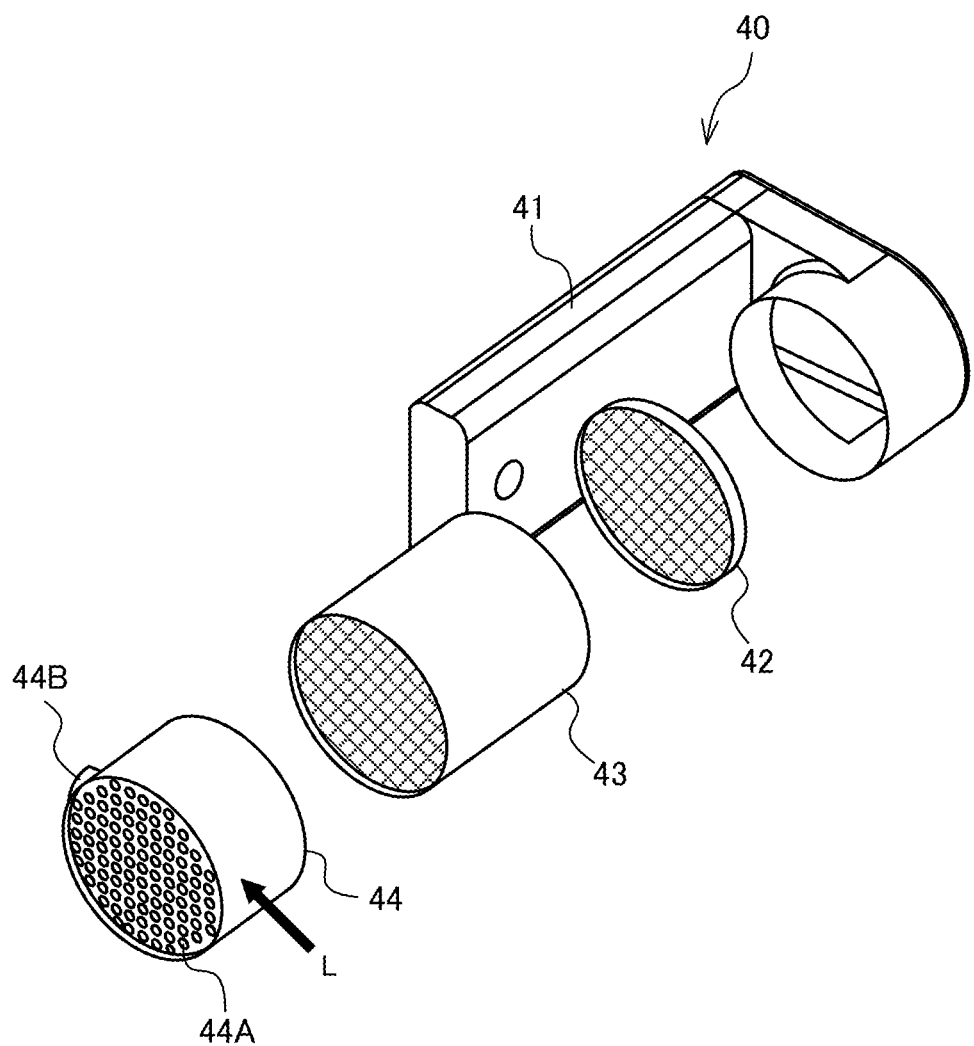
FIG. 3 is an exploded perspective view of a discharged gas combustor.

Next, a configuration of the discharged gas combustor 40 is described with reference to FIGS. 2A and 3. FIG. 3 is an exploded perspective view of the discharged gas combustor 40.

The discharged gas combustor 40 includes a flow path portion 41 through which the anode off-gas and the cathode off-gas discharged from the fuel cell stack 1 flow, and a heater 42 provided at a downstream end of the flow path portion 41, a first catalyst combustor 43 provided at a downstream end of the heater 42, and a vaporizer 44 provided on a downstream side of the first catalyst combustor 43.

The flow path portion 41 is a gas passage whose upstream end is connected to the manifold 50 and supplies the off-gas discharged from the manifold 50 to the heater 42. The flow path portion 41 is configured as a substantially U-shaped passage member that is linearly extended so as to be separated from the manifold 50, and then folded back toward the manifold 50.

The heater 42 is disposed at the downstream end of the flow path portion 41. The heater 42 is, for example, a disk-shaped honeycomb structure, and is configured to heat the gas passing through the inside. The first catalyst combustor 43 is disposed at the downstream end of the heater 42.

The first catalyst combustor 43 is a combustor including a carrier as a tubular honeycomb structure, and a catalyst supported on the carrier. The first catalyst combustor 43 catalytically combusts the anode off-gas and the cathode off-gas to generate a high-temperature discharged gas.

The vaporizer 44 is provided at a downstream end of the first catalyst combustor 43. The vaporizer 44 is configured as a tubular member having a plurality of gas passage holes 44A, and has a downstream end connected to an end surface of the manifold 50 by welding or the like. The discharged gas generated by the first catalyst combustor 43 is supplied to the manifold 50 through the gas passage holes 44A of the vaporizer 44.

The vaporizer 44 has an internal flow path 44B independent of the gas passage holes 44A, and the raw fuel supplied from the fuel supply line L is supplied to an upstream side of the flow path portion 41 through the internal flow path 44B. That is, the vaporizer 44 is configured to vaporize the raw fuel and supply the fuel gas to the flow path portion 41 by exchanging heat with the raw fuel passing through the internal flow path 44B, when the high-temperature discharged gas generated by the first catalyst combustor 43 passes through the gas passage holes 44A at the time of system startup or the like. Since the supply of the raw fuel to the internal flow path 44B is stopped after the warm-up is completed, the vaporizer 44 functions as a passage member that guides the discharged gas discharged from the first catalyst combustor 43 to the manifold 50.

Figure 4:
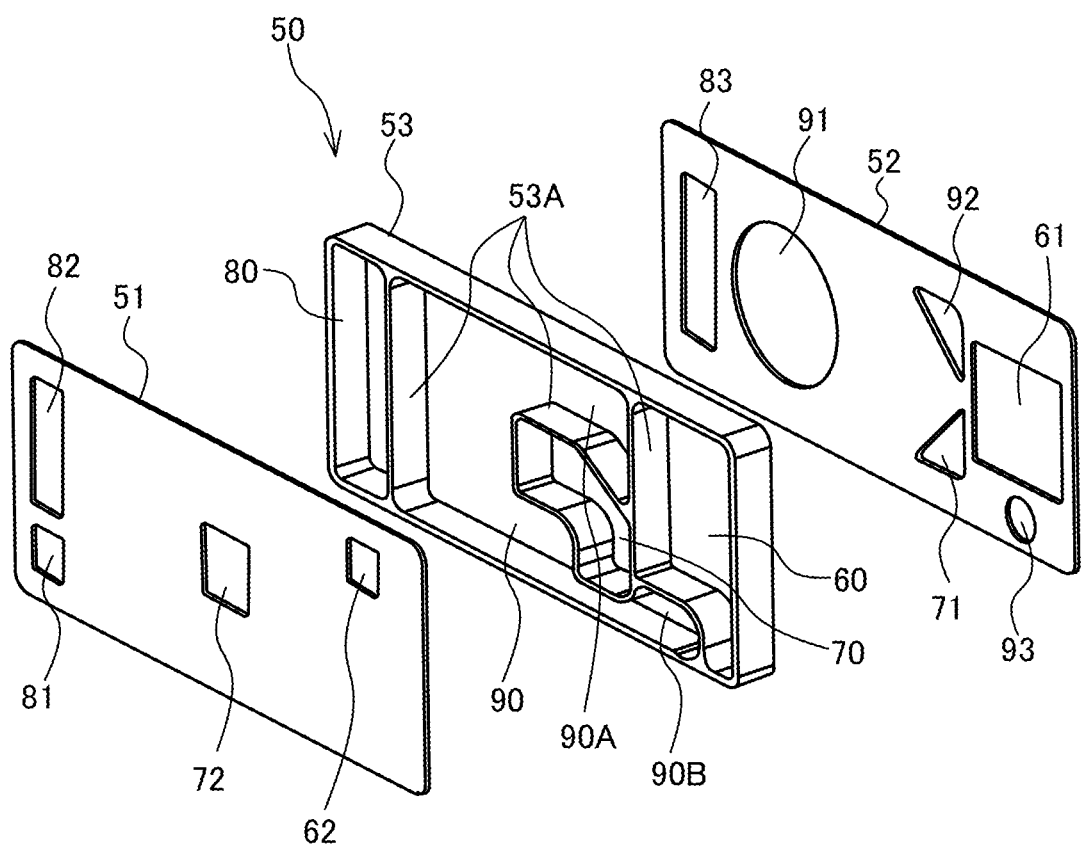
FIG. 4 is an exploded perspective view of a manifold that connects a fuel cell stack and the discharged gas combustor.

Next, a configuration of the manifold 50 is described with reference to FIG. 4. FIG. 4 is an exploded perspective view of the manifold 50.

As shown in FIG. 4, the manifold 50 includes a main body portion 53 formed as a rectangular frame body having both ends open, a first plate 51 covering an opening of the main body portion 53 on the fuel cell stack 1 side, and a second plate 52 covering an opening of the main body portion 53 on the discharged gas combustor 40 side.

The main body portion 53 has partition walls 53A that partition an inside of the main body portion 53 into a plurality of spaces. The plurality of spaces in the main body portion 53, and the first and second plates 51 and 52 disposed at both ends of the main body portion 53 form, inside the manifold 50, four flow paths through which various gases flow. In the manifold 50, an anode flow path 60, a cathode flow path 70, an off-gas flow path 80, and a discharged gas flow path 90 are formed as the flow paths through which various gases flow.

The anode flow path 60 is a flow path for supplying the anode gas generated by the reformer 20 to the fuel cell stack 1. The anode flow path 60 is disposed at a position closer to a right end in the drawing in a width direction of the manifold 50.

The second plate 52 is formed with an anode supply port 61 for supplying the anode gas to the anode flow path 60, and the first plate 51 is formed with an anode discharge port 62 for discharging the anode gas passing through the anode flow path 60 is discharged to the fuel cell stack 1. The anode discharge port 62 is connected to an upstream end of the anode gas supply pipe 2 (see FIG. 2B) described above.

The cathode flow path 70 is a flow path for supplying the cathode gas heated by the air heat exchanger 30 to the fuel cell stack 1. The cathode flow path 70 is disposed at a substantially central position of the manifold 50.

The second plate 52 is formed with a cathode supply port 71 for supplying the cathode gas to the cathode flow path 70, and the first plate 51 is formed with a cathode discharge port 72 for discharging the cathode gas passing through the cathode flow path 70 to the fuel cell stack 1. The cathode discharge port 72 is connected to an upstream end of the cathode gas supply pipe 3 (see FIG. 2B) described above.

The off-gas flow path 80 is a flow path in which the anode off-gas and the cathode off-gas discharged from the fuel cell stack 1 merge and are guided to the flow path portion 41 of the discharged gas combustor 40. The off-gas flow path 80 is disposed at a position closer to a left end in the drawing in the width direction of the manifold 50.

The first plate 51 is formed with an anode off-gas supply port 81 for supplying the anode off-gas to the off-gas flow path 80, and a cathode off-gas supply port 82 for supplying the cathode off-gas to the off-gas flow path 80. The anode off-gas supply port 81 is connected to a downstream end of the anode off-gas discharge pipe 4A, and the cathode off-gas supply port 82 is connected to a downstream end of the cathode off-gas discharge pipe 4B. The second plate 52 is formed with an off-gas discharge port 83 for discharging the off-gas passing through the off-gas flow path 80 to the discharged gas combustor 40. In the first plate 51, the anode off-gas supply port 81 is formed below the cathode off-gas supply port 82.

The off-gas flowing from the off-gas flow path 80 into the discharged gas combustor 40 is combusted by the first catalyst combustor 43 of the discharged gas combustor 40, and the discharged gas after combustion is supplied to the discharged gas flow path 90 of the manifold 50 through the vaporizer 44 of the discharged gas combustor 40.

The discharged gas flow path 90 is a flow path for guiding the discharged gas discharged from the discharged gas combustor 40 to the reformer 20 and the air heat exchanger 30 as the heat exchange devices. The discharged gas flow path 90 is configured such that a downstream side branches into two flow paths. That is, one branch flow path of the discharged gas flow path 90 is configured as a first discharged gas flow path 90A for guiding a part of the discharged gas flowing from the discharged gas combustor 40 into the manifold 50 to the air heat exchanger 30, and the other branch flow path of the discharged gas flow path 90 is configured as a second discharged gas flow path 90B for guiding a remaining part of the discharged gas to the reformer 20.

The discharged gas flow path 90 is disposed so as to be located between the off-gas flow path 80 and the anode flow path 60 in the width direction of the manifold 50. Further, the first discharged gas flow path 90A extends so as to cross above the cathode flow path 70, and the second discharged gas flow path 90B extends so as to cross below the cathode flow path 70. In this way, the cathode flow path 70 is disposed so as to be located between the first discharged gas flow path 90A and the second discharged gas flow path 90B in a vertical direction orthogonal to the width direction of the manifold 50.

The first plate 51 is formed with a discharged gas supply port 91 for supplying the discharged gas to the discharged gas flow path 90, which is an upstream portion of the first and second discharged gas flow paths 90A and 90B. Further, the first plate 51 is formed with a first discharged gas supply port 92 for supplying the discharged gas passing through the first discharged gas flow path 90A to the air heat exchanger 30, and a second discharged gas discharge port 93 for supplying the discharged gas passing through the second discharged gas flow path 90B to the reformer 20.

As described above, the fuel cell system 100 according to the present embodiment adopts a configuration in which the gases such as the off-gas and the discharged gas are guided by using the various flow paths formed in one manifold 50, and thus the fuel cell system 100 can be configured to be compact as compared with a related-art method in which gases are guided by using a plurality of pipes instead of using the manifold 50.

Further, in the fuel cell system 100, the off-gas is combusted by the first catalyst combustor 43 of the discharged gas combustor 40, and the discharged gas after combustion is used as a heat source for the heat exchange device such as the reformer 20. However, when the vaporizer 44 or the like is disposed downstream of the first catalyst combustor 43 as in the fuel cell system 100, it is considered that a discharged gas temperature decreases when the discharged gas passes through the vaporizer 44, and the heat exchange efficiency with the heat exchange device deteriorates.

Therefore, in order to prevent the decrease in the discharged gas temperature, the manifold 50 of the fuel cell system 100 is provided with a second catalyst combustor 54 that combusts the discharged gas flowing into the manifold 50 through the vaporizer 44.

Figure 5:
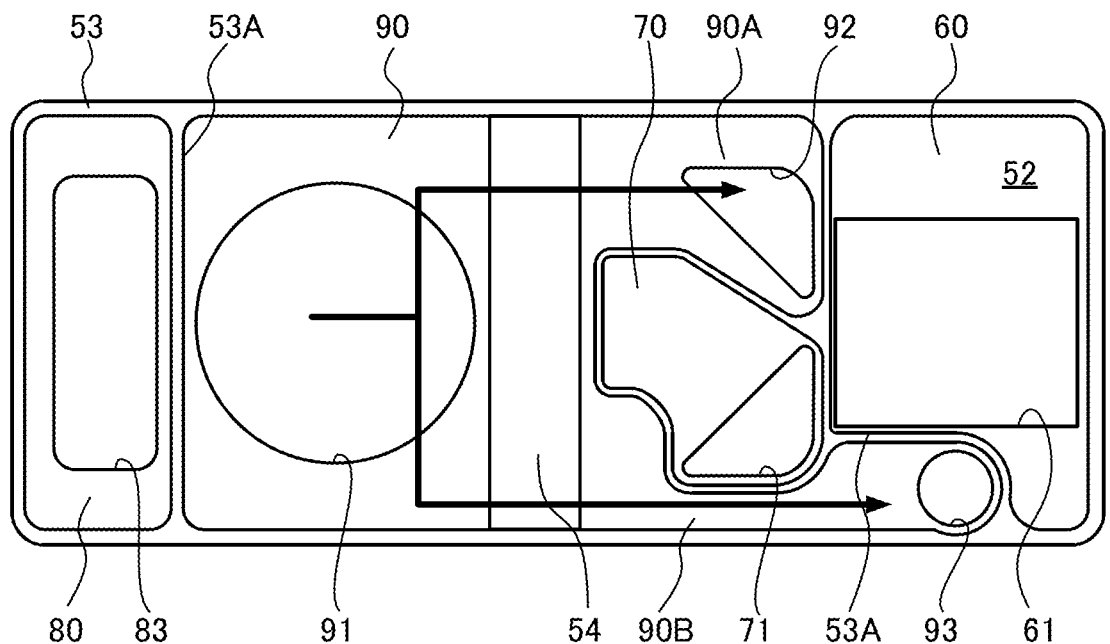
FIG. 5 is a view illustrating a state of an inside of the manifold.
Figure 6:
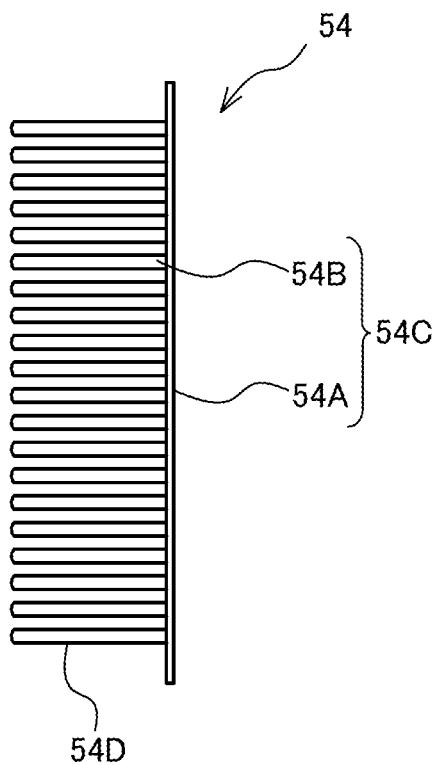
FIG. 6 is a side view of a second catalyst combustor arranged in the manifold.
Figure 7:
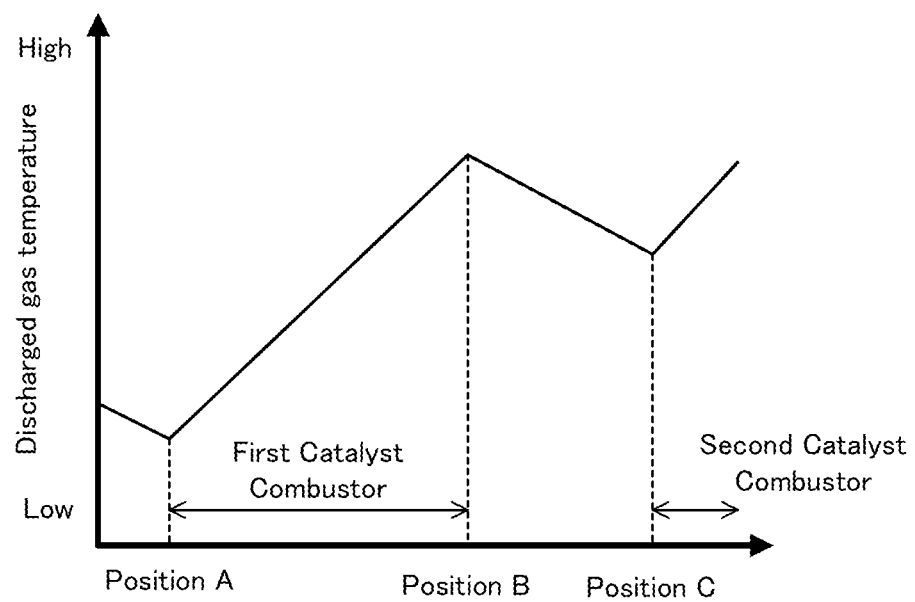
FIG. 7 is a diagram illustrating a temperature change of a discharged gas.

The second catalyst combustor 54 is described with reference to FIGS. 5 to 7. FIG. 5 is a view illustrating an inside of the manifold 50. FIG. 6 is a side view of the second catalyst combustor 54 disposed in the manifold 50. FIG. 7 is a diagram illustrating a temperature change of the discharged gas.

As shown in FIG. 5, the second catalyst combustor 54 is provided in the discharged gas flow path 90 before the first and second discharged gas flow paths 90A and 90B branch, so as to vertically traverse the discharged gas flow path 90. The second catalyst combustor 54 is disposed so as to be located between the discharged gas supply port 91 and the first and second discharged gas discharge ports 92 and 93 formed in the second plate 52.

As shown in FIG. 6, the second catalyst combustor 54 includes a carrier 54C consisting of a base plate 54A and a plurality of flat plates 54B standing vertically from a surface of the base plate 54A, and a catalyst 54D supported on the carrier 54C. As shown by arrows in FIG. 5, the plurality of flat plates 54B are arranged so as to be parallel to a gas flow direction, and when the discharged gas passes between these flat plates 54B, a fuel component remaining in the discharged gas is catalytically combusted.

As shown in FIGS. 2A and 7, the off-gas discharged from the fuel cell stack 1 is combusted in the first catalyst combustor 43 of the discharged gas combustor 40, and thus the discharged gas temperature increases while the discharged gas passes through the first catalyst combustor 43 (position A to position B). Thereafter, the discharged gas discharged from the first catalyst combustor 43 passes through the vaporizer 44, and thus the discharged gas temperature decreases due to the heat exchange with the vaporizer 44 while the discharged gas passes through the vaporizer 44.

However, the discharged gas passing through the vaporizer 44 and flowing into the manifold 50 passes through the second catalyst combustor 54, as shown by the arrows in FIG. 5. While the discharged gas is passing through the second catalyst combustor 54, the fuel component contained in the discharged gas is combusted, and thus as shown in FIG. 7, the discharged gas temperature increases again from a position C passing through the second catalyst combustor 54. In this way, according to the second catalyst combustor 54 of the manifold 50, the discharged gas temperature can be increased even when the discharged gas temperature decreases when the discharged gas passes through the vaporizer 44.

According to the fuel cell system 100 in the present embodiment described above, the following effects can be obtained.

The fuel cell system 100 includes the fuel cell stack 1 that generates electricity by receiving the working gas such as the anode gas and the cathode gas, the discharged gas combustor 40 that combusts the off-gas discharged from the fuel cell stack 1, and the heat exchange device such as the reformer 20 that supplies the working gas to the fuel cell stack 1 and exchanges heat with the discharged gas from the discharged gas combustor 40. The fuel cell system 100 further includes the manifold 50 disposed between the fuel cell stack 1 and the discharged gas combustor 40, and between the fuel cell stack 1 and the heat exchange device such as and the reformer 20. The manifold 50 includes the off-gas flow path 80 for guiding the off-gas discharged from the fuel cell stack 1 to the discharged gas combustor 40, and the discharged gas flow path 90 for guiding the discharged gas discharged from the discharged gas combustor 40 to the heat exchange device such as the reformer 20. More specifically, the discharged gas flow path 90 includes the first discharged gas flow path 90A for guiding a part of the discharged gas discharged from the discharged gas combustor 40 to the air heat exchanger 30 (cathode heat exchanger), and the second discharged gas flow path 90B for guiding the remaining part of the discharged gas to the reformer 20.

In this way, in the fuel cell system 100, a plurality of flow paths such as the off-gas flow path 80 and the discharged gas flow path 90 are formed in one manifold 50, and the manifold 50 is disposed between the fuel cell stack 1 and the discharged gas combustor 40, and between the fuel cell stack 1 and the heat exchange device, and thus the system configuration can be made more compact than the case where these devices are connected by using a plurality of pipes.

The discharged gas combustor 40 of the fuel cell system 100 includes the first catalyst combustor 43 that combusts the off-gas, and the vaporizer 44 that vaporizes the raw fuel by exchanging heat with the discharged gas generated by the first catalyst combustor 43 and supplies the vaporized fuel to the discharged gas combustor 40. Further, the discharged gas flow path 90 of the manifold 50 is provided with the second catalyst combustor 54 that combusts the discharged gas flowing into the manifold 50 through the vaporizer 44.

With such a configuration, when the discharged gas passing through the vaporizer 44 and flowing into the manifold 50 passes through the second catalyst combustor 54, the fuel component contained in the discharged gas is combusted, so that the discharged gas temperature decreased when the discharged gas passes through the vaporizer 44 can be increased again by the second catalyst combustor 54. Therefore, the temperature of the discharged gas immediately before flowing into the heat exchange devices such as the reformer 20 and the air heat exchanger 30 can be maintained at a high temperature, and the deterioration of the heat exchange efficiency of the heat exchange devices can be prevented.

The second catalyst combustor 54 provided in the manifold 50 includes the carrier 54C in which the plurality of flat plates 54B are arranged so as to be parallel to the gas flow direction, and the catalyst 54D supported on the carrier 54C.

With such a configuration, when the discharged gas passes through the flat plates 54B, the fuel component contained in the discharged gas can be more reliably catalytically combusted using the catalyst 54D, and the discharged gas temperature can be efficiently increased. Further, the discharged gas passes between the flat plates 54B of the second catalyst combustor 54, and thus the discharged gas flow can be made uniform. Therefore, temperature unevenness can be prevented in the discharged gas after passing through the second catalyst combustor 54.

The manifold 50 further includes the anode flow path 60 for supplying the anode gas generated by the reformer 20 to the fuel cell stack 1. In the width direction of the manifold 50, the off-gas flow path 80 is located on one end side of the manifold 50, the anode flow path 60 is located on the other end side of the manifold 50, and the discharged gas flow path 90 is located between the off-gas flow path 80 and the anode flow path 60.

In this way, by forming the discharged gas flow path 90 between the off-gas flow path 80 and the anode flow path 60 in the manifold 50, a flow path length of the discharged gas flow path 90 can be shortened. As a result, the decrease in the discharged gas temperature during a period until the discharged gas discharged from the discharged gas combustor 40 reaches the second catalyst combustor 54 can be prevented, and a temperature of a catalyst of the second catalyst combustor 54 can be increased to an active temperature at an early stage. Further, since a distance from the second catalyst combustor 54 to the heat exchange device such as the reformer 20 is shortened, the decrease in temperature of the discharged gas after passing through the second catalyst combustor 54 can also be prevented, and the heat exchange efficiency of the heat exchange device can be increased.

The manifold 50 further includes the cathode flow path 70 for supplying the cathode gas heated by the air heat exchanger 30 to the fuel cell stack 1. The cathode flow path 70 is located between the first discharged gas flow path 90A and the second discharged gas flow path 90B in the direction orthogonal to the width direction of the manifold 50.

With such a flow path arrangement, various flow paths in the manifold 50 can be laid out without generating a wasted space. As a result, the fuel cell system 100 can be made smaller.

(First Modification)

Next, the fuel cell system 100 according to a first modification of the above-described embodiment is described with reference to FIG. 8. In the following description of the modification, the same reference numerals are used for configurations and the like that perform the same functions as those of the present embodiment, and duplicate descriptions are omitted as appropriate.

Figure 8:
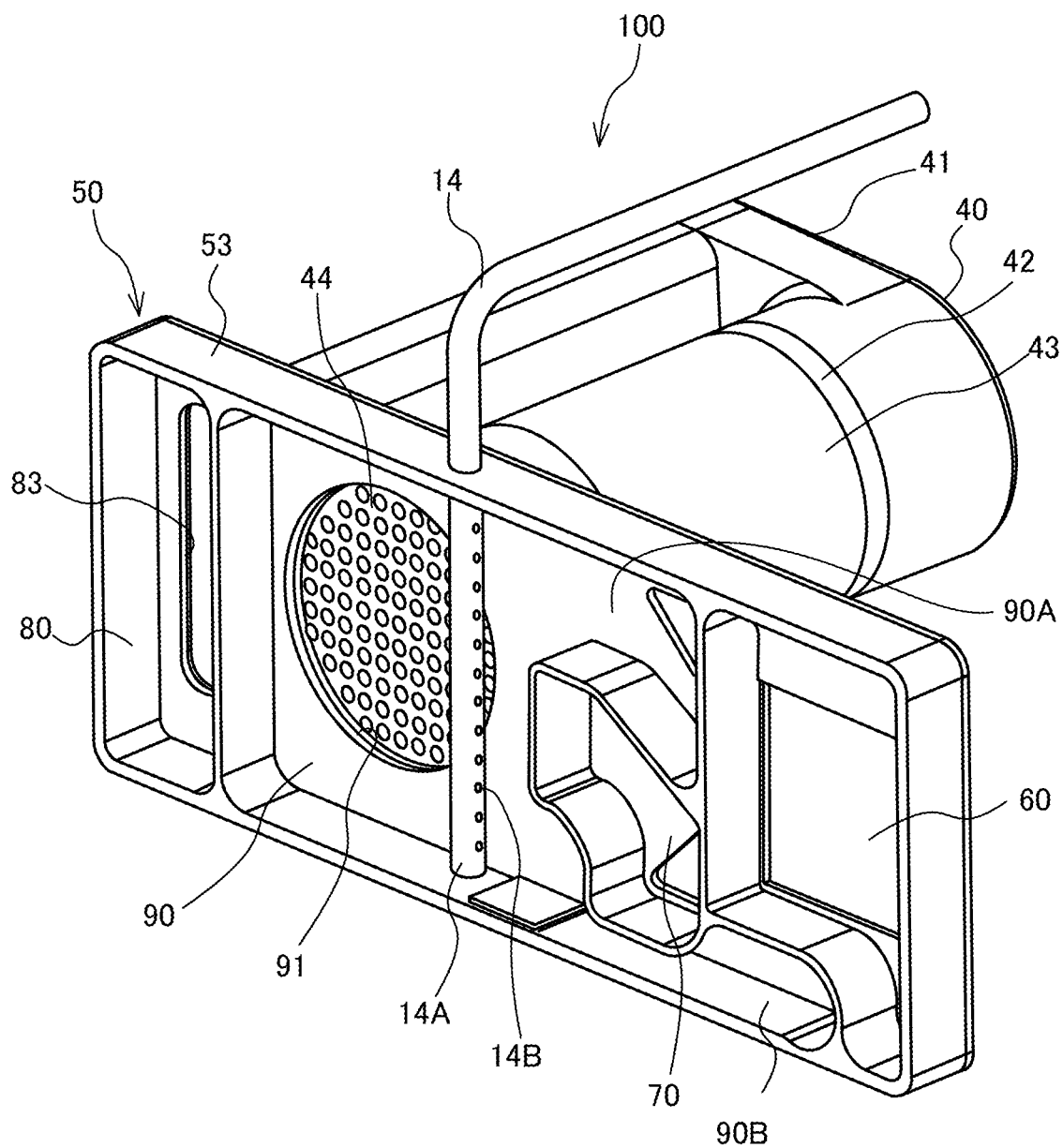
FIG. 8 is a view illustrating a first modification of the fuel cell system according to the present embodiment.

FIG. 8 is a schematic configuration view illustrating the first modification of the fuel cell system 100 according to the present embodiment. In FIG. 8, the descriptions of some components such as the reformer 20, the air heat exchanger 30, and the first plate 51 are omitted.

As shown in FIG. 8, the fuel cell system 100 according to the first modification further includes a supply pipe 14 for supplying the raw fuel to upstream of the second catalyst combustor (not shown) in the discharged gas flow path 90 in the manifold 50.

The supply pipe 14 is configured such that one end thereof is connected to the fuel tank 10 (see FIG. 1), and the other end thereof is inserted into the manifold 50. In this way, the supply pipe 14 is attached to the manifold 50 in a state in which a tip portion 14A is inserted into the discharged gas flow path 90 of the manifold 50. The tip portion 14A of the supply pipe 14 is linearly extended in the discharged gas flow path 90 in the vertical direction orthogonal to the width direction of the manifold 50, and the tip portion 14A is provided with a plurality of fuel supply ports 14B along a pipe extension direction. The plurality of fuel supply ports 14B are provided toward downstream of the discharged gas flow path 90, and more specifically, to face the second catalyst combustor 54.

In the fuel cell system 100 according to the present modification, when it is necessary to increase the temperature of the heat exchange device such as the reformer 20 more efficiently, the raw fuel of the fuel tank 10 is supplied by injecting from the fuel supply ports 14B of the supply pipe 14 toward the second catalyst combustor 54. In this way, the fuel is directly supplied to the second catalyst combustor 54, and thus the catalytic combustion in the second catalyst combustor 54 is enhanced, and a high-temperature discharged gas can be sufficiently supplied to the heat exchange device such as the reformer 20.

In the present modification, the tip portion 14A of the supply pipe 14 is linearly extended, but the tip portion 14A may have a shape other than the linear shape as long as the fuel can be supplied into the discharged gas flow path 90. Further, the number and direction of the fuel supply ports 14B may also be different from those described above as long as the fuel supplied from the fuel supply ports 14B can be combusted by the second catalyst combustor 54.

According to the fuel cell system 100 in the first modification described above, the following effects can be obtained.

The fuel cell system 100 further includes the supply pipe 14 for supplying the raw fuel to the upstream of the second catalyst combustor 54 in the manifold 50. According to such a configuration, the raw fuel can be supplied from the supply pipe 14 to the second catalyst combustor 54 as needed, and the high-temperature discharged gas can be sufficiently supplied to the heat exchange device such as the reformer 20.

The supply pipe 14 is attached to the manifold 50 in the state in which the tip portion 14A is inserted into the manifold 50, and the tip portion 14A is provided with the plurality of fuel supply ports 14B along the pipe extension direction. In this way, the fuel is supplied from the fuel supply ports 14B disposed along the pipe extension direction, and thus a fuel flow generated in the manifold 50 can be made uniform, and temperature distribution of the discharged gas generated in the second catalyst combustor 54 can also be made uniform.

Further, the plurality of fuel supply ports 14B are disposed such that the fuel is supplied toward the downstream of the manifold 50. With this configuration, a sufficient amount of fuel can be supplied to the second catalyst combustor 54 located downstream of the supply pipe 14.

(Second Modification)

Figure 9:
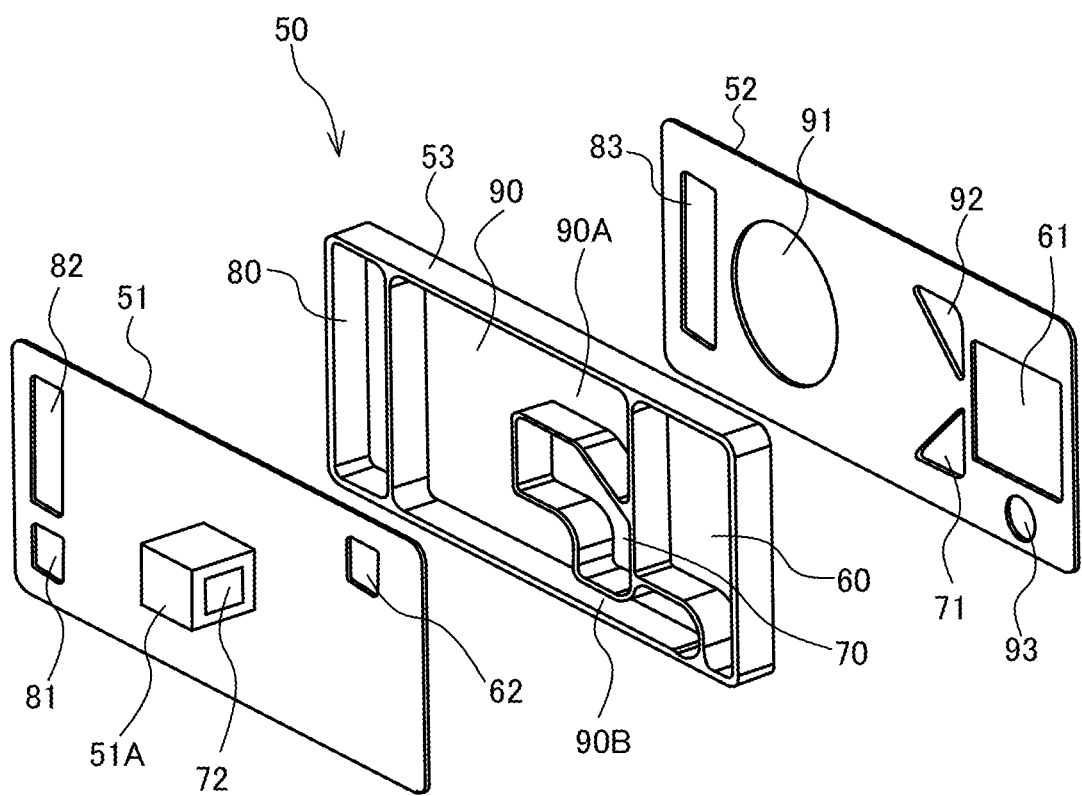
FIG. 9 is a view illustrating a manifold of a fuel cell system according to a second modification of the present embodiment.

Next, the fuel cell system 100 according to a second modification is described with reference to FIG. 9. FIG. 9 is an exploded perspective view of the manifold 50 of the fuel cell system 100 according to the second modification.

In the manifold 50 of the fuel cell system 100 according to the second modification, a configuration of the first plate 51 is different from that of the first plate of the manifold illustrated in FIG. 4.

As shown in FIG. 9, in the manifold 50 according to the second modification, a portion of the first plate 51 facing the cathode flow path 70 is formed as a protruding portion 51A protruding toward the fuel cell stack 1. The protruding portion 51A is configured such that an internal space communicates with the cathode flow path 70.

The protruding portion 51A is formed in a substantially rectangular parallelepiped tubular shape, and one side surface of the protruding portion 51A is formed with a cathode discharge port 72 for discharging the cathode gas passing through the cathode flow path 70 to the fuel cell stack 1. The cathode discharge port 72 is connected to the upstream end of the cathode gas supply pipe 3 described with reference to FIG. 2B.

The cathode discharge port 72 is fixed to the upstream end of the cathode gas supply pipe 3 by a fastening means such as bolt fastening, so that a fastening space for fixing the cathode gas supply pipe 3 is required around the cathode discharge port 72. However, the second catalyst combustor 54 is disposed in the discharged gas flow path 90 adjacent to the cathode flow path 70, and thus when the cathode discharge port 72 is formed on a plate end surface of the first plate as shown in FIG. 4, it may be difficult to secure the fastening space for fixing the cathode gas supply pipe 3.

In the manifold 50 according to the present modification, the protruding portion 51A is provided on the first plate 51 forming the manifold end surface, and the protruding portion 51A is formed with the cathode discharge port 72, and thus the cathode discharge port 72 can be disposed at a position different from the end surface of the first plate 51, and the fastening space for the cathode gas supply pipe 3 can be secured in the protruding portion 51A.

(Third Modification)

Figure 10:
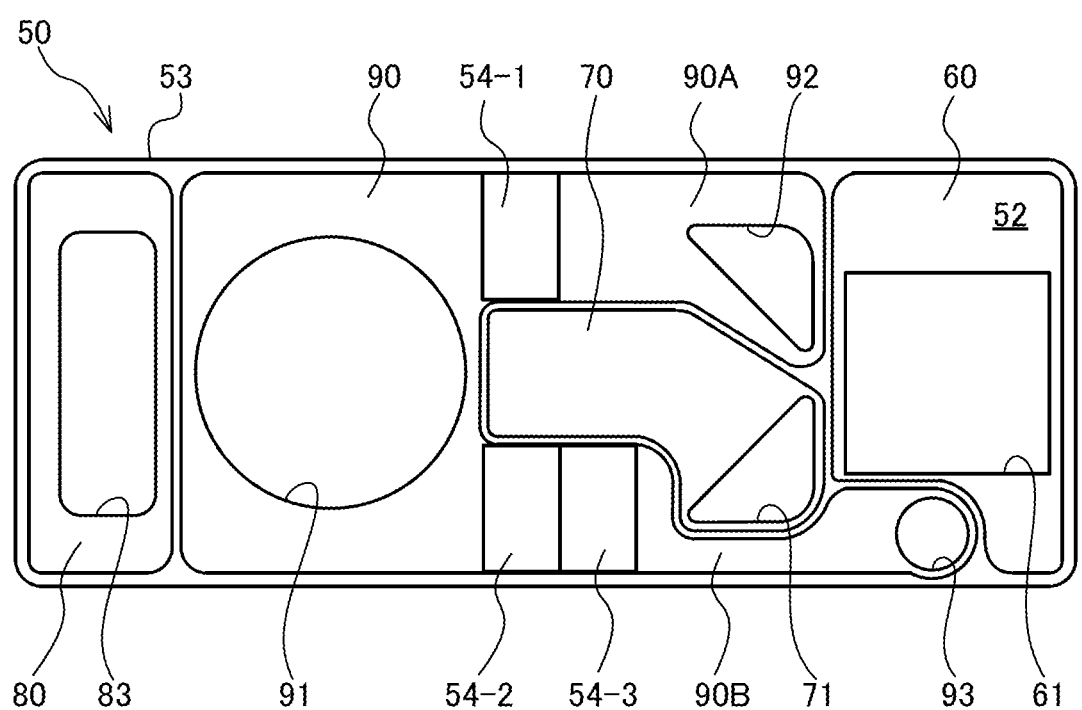
FIG. 10 is a view illustrating a manifold of a fuel cell system according to a third modification of the present embodiment.

Next, the fuel cell system 100 according to a third modification of the present embodiment is described with reference to FIG. 10. FIG. 10 is a view illustrating an inside of the manifold 50 of the fuel cell system 100 according to the third modification.

As shown in FIG. 10, in the manifold 50 according to the third modification, three second catalyst combustors 54 are provided in the discharged gas flow path 90. That is, one second catalyst combustor 54-1 is provided in the first discharged gas flow path 90A for guiding the discharged gas to the air heat exchanger 30, and two second catalyst combustors 54-2 and 54-3 are provided in the second discharged gas flow path 90B for guiding the discharged gas to the reformer 20. The two second catalyst combustors 54-2 and 54-3 are disposed so as to be adjacent to each other along an extension direction (gas flow direction) of the second discharged gas flow path 90B.

The second catalyst combustors 54-1, 54-2, and 54-3 each include a carrier consisting of a base plate and a plurality of flat plates standing vertically from a surface of the base plate, and a catalyst supported on the carrier, as the second catalyst combustor shown in FIG. 6. The plurality of flat plates of the second catalyst combustor 54-1 are arranged so as to be parallel to the gas flow direction of the first discharged gas flow path 90A, and the plurality of flat plates of the second catalyst combustors 54-2 and 54-3 are arranged so as to be parallel to the gas flow direction of the second discharged gas flow path 90B.

In the present modification, the second catalyst combustor 54-1 and the second catalyst combustors 54-2 and 54-3 are disposed in the first and second discharged gas flow paths 90A and 90B, respectively. With such a configuration, the discharged gas temperature decreased when the discharged gas passes through the vaporizer 44 can also be increased again by the second catalyst combustors 54-1, 54-2, and 54-3. Therefore, the temperature of the discharged gas flowing into the heat exchange devices such as the reformer 20 and the air heat exchanger 30 can be maintained at a high temperature, and the deterioration of the heat exchange efficiency of the heat exchange devices can be prevented.

Further, in the fuel cell system 100 according to the present modification, in order to make a flow rate of a discharged gas supplied to the air heat exchanger 30 larger than a flow rate of a discharged gas supplied to the reformer 20, one second catalyst combustor 54-1 is disposed in the first discharged gas flow path 90A, and two second catalyst combustors 54-2 and 54-3 are disposed in the second discharged gas flow path 90B, and thus a ventilation resistance of the first discharged gas flow path 90A is made smaller than a ventilation resistance of the second discharged gas flow path 90B. In this way, by providing different number of second catalyst combustors 54 in the flow paths, the flow rates of the discharged gases flowing through the first and second discharged gas flow paths 90A and 90B can be adjusted, and the manifold 50 can be provided with a flow-separating function.

In the present modification, one second catalyst combustor 54-1 is disposed in the first discharged gas flow path 90A, and two second catalyst combustors 54-2 and 54-3 are disposed in the second discharged gas flow path 90B, but the number of second catalyst combustors disposed in each flow path can be optionally set according to a discharged gas flow rate required by a heat exchange device such as a reformer. Therefore, the number of second catalyst combustors disposed in the first discharged gas flow path 90A may be larger than the number of second catalyst combustors disposed in the second discharged gas flow path 90B. Further, the number of the second catalyst combustors disposed in the first discharged gas flow path 90A and the number of the second catalyst combustors disposed in the second discharged gas flow path 90B may be the same.

Further, sizes of second catalyst combustors arranged in the first and second discharged gas flow paths 90A and 90B may be different. That is, the second catalyst combustor disposed in the second discharged gas flow path 90B may be a catalyst combustor in which the second catalyst combustors 54-2 and 54-3 in FIG. 10 are integrated. In this case, a width of the second catalyst combustor disposed in the second discharged gas flow path 90B is set to be about twice a width of the second catalyst combustor disposed in the first discharged gas flow path 90A.

(Fourth Modification)

Figure 11:
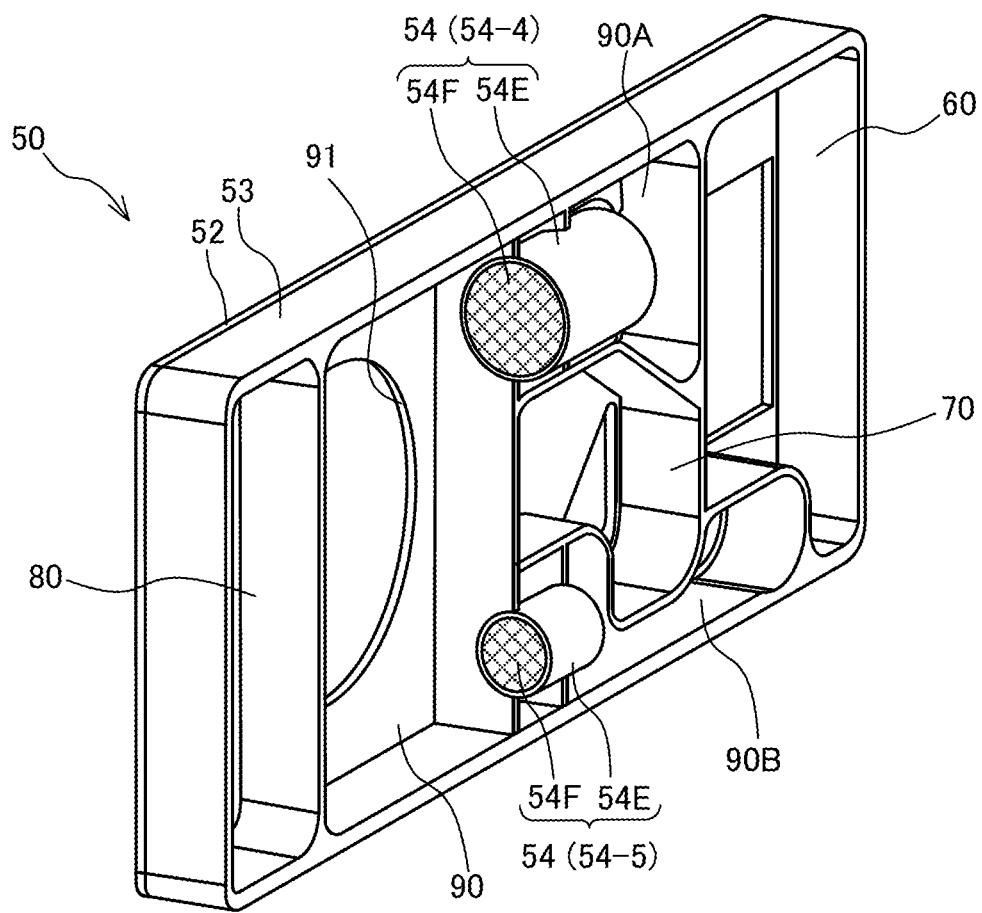
FIG. 11 is a view illustrating a manifold of a fuel cell system according to a fourth modification of the present embodiment.
Figure 12:
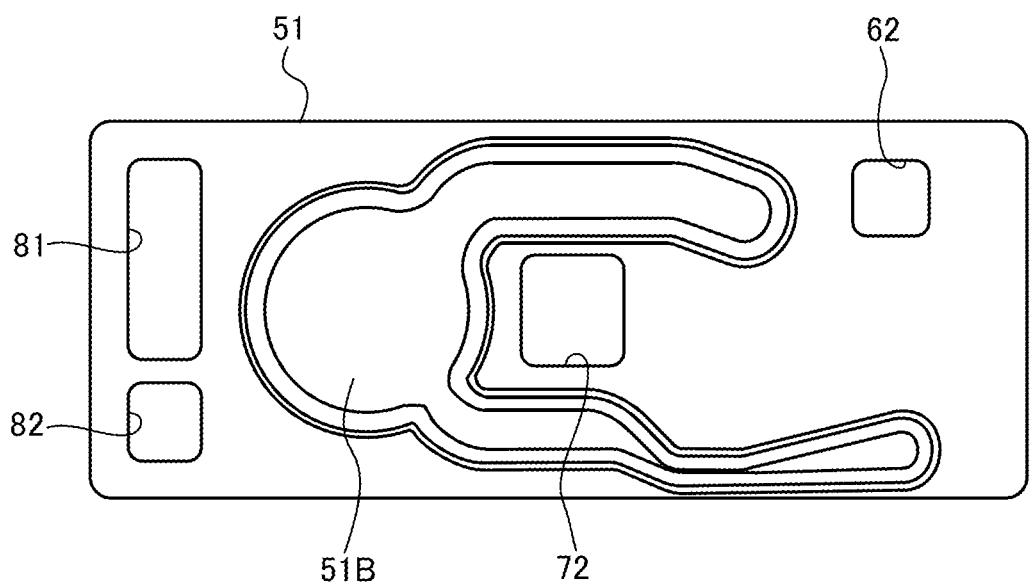
FIG. 12 is a view illustrating a first plate of the manifold of the fuel cell system according to the fourth modification of the present embodiment.

Next, the manifold 50 of the fuel cell system 100 according to a fourth modification of the present embodiment is described with reference to FIGS. 11 and 12. FIG. 11 is a view illustrating an inside of the manifold 50 according to the fourth modification, and FIG. 12 is a view illustrating the first plate 51 of the manifold 50 according to the fourth modification.

As shown in FIG. 11, in the manifold 50 of the fuel cell system 100 according to the fourth modification, one second catalyst combustor 54-4 and one second catalyst combustor 54-5 are provided in the first and second discharged gas flow paths 90A and 90B, respectively. The second catalyst combustors 54-4 and 54-5 are fixed to the flow paths while being supported by the partition wall 53A of the main body portion 53.

The second catalyst combustors 54-4 and 54-5 each include a carrier 54E as a substantially cylindrical honeycomb structure, and a catalyst 54F supported on the carrier 54E. The second catalyst combustors 54-4 and 54-5 are disposed such that an extension direction of an internal passage of the carrier 54E is parallel to the gas flow direction of the flow path.

In the present modification, the second catalyst combustors 54-4 and 54-5 are disposed in the first and second discharged gas flow paths 90A and 90B, respectively. With such a configuration, the discharged gas temperature decreased when the discharged gas passes through the vaporizer 44 can also be increased again by the second catalyst combustors 54-4 and 54-5. Therefore, the temperature of the discharged gas flowing into the heat exchange devices such as the reformer 20 and the air heat exchanger 30 can be maintained at a high temperature, and the deterioration of the heat exchange efficiency of the heat exchange devices can be prevented.

Further, in the fuel cell system 100 according to the present modification, in order to make a flow rate of a discharged gas supplied to the air heat exchanger 30 larger than a flow rate of a discharged gas supplied to the reformer 20, a passage cross-sectional area of the second catalyst combustor 54-4 disposed in the first discharged gas flow path 90A is set to be larger than a passage cross-sectional area of the second catalyst combustor 54-5 disposed in the second discharged gas flow path 90B, and thus a ventilation resistance of the first discharged gas flow path 90A is made smaller than a ventilation resistance of the second discharged gas flow path 90B. In this way, sizes of the second catalyst combustors 54 disposed in the flow paths are different, and thus the flow rates of the discharged gases flowing through the first and second discharged gas flow paths 90A and 90B can be adjusted, and the manifold 50 can be provided with a flow-separating function.

In a case where sizes of the second catalyst combustors 54-4 and 54-5 are increased, when the second catalyst combustors 54-4 and 54-5 are disposed in the main body portion 53, each of the catalyst combustors 54-4 and 54-5 may partially protrude outward from the main body portion 53. In such a case, as shown in FIG. 12, a recess 51B along the discharged gas flow path 90 is formed in the first plate 51, thereby allowing the second catalyst combustors 54-4 and 54-5 to protrude outward.

Sizes of the second catalyst combustors disposed in the first and second discharged gas flow paths 90A and 90B are set to be the same, the number of second catalyst combustors disposed in the second discharged gas flow path 90B is set to be larger than the number of second catalyst combustors disposed in the first discharged gas flow path 90A, and thereby a flow rate of the discharged gas flowing through the first discharged gas flow path 90A may be larger than a flow rate of the discharged gas flowing through the second discharged gas flow path 90B.

Further, in the present modification, the second catalyst combustor 54-4 in the first discharged gas flow path 90A is configured to be larger than the second catalyst combustor 54-5 in the second discharged gas flow path 90B, but the size of the second catalyst combustor disposed in each flow path can be optionally set according to a discharged gas flow rate required by a heat exchange device such as a reformer. Therefore, the second catalyst combustor disposed in the first discharged gas flow path 90A may be configured to be larger than the second catalyst combustor disposed in the second discharged gas flow path 90B, or may be the same size as the second catalyst combustor disposed in the second discharged gas flow path 90B. Further, by making passage cross-sectional areas of the second catalyst combustors disposed in the first and second discharged gas flow paths 90A and 90B the same, and making lengths of the second catalyst combustors in the gas flow direction different, the ventilation resistance may be adjusted, and the discharged gas flow rate may be adjusted.

As described above, the embodiment of the present invention is described, but the above embodiment merely shows a part of application examples of the present invention, and does not intend to limit the technical scope of the present invention to the specific configurations of the above embodiment. Various changes and modifications can be made on the above embodiment within the scope of matters described in claims. Further, the technical idea described in the above embodiment and modifications may be combined as appropriate.

The invention claimed is:

1. A fuel cell system, comprising:
a fuel cell configured to generate electricity by receiving an anode gas, which is a fuel gas, and a cathode gas, which is an oxidant gas;
a combustor disposed outside of the fuel cell and configured to combust an off-gas discharged from the fuel cell;
a heat exchange device disposed outside of the fuel cell and configured to supply the anode gas and the cathode gas to the fuel cell, while performing heat exchange with a discharged gas from the combustor, wherein the heat exchange device includes a cathode heat exchanger configured to heat the cathode gas using heat of a discharged gas from the combustor, and a reformer configured to reform a raw fuel into the anode gas using the heat of the discharged gas;
a manifold disposed between the fuel cell and the combustor, and between the fuel cell and the heat exchange device, wherein:
the manifold includes an off-gas flow path along which the off-gas discharged from the fuel cell is guided to the combustor, and a discharged gas flow path along which the discharged gas discharged from the combustor is guided to the heat exchange device, wherein:
the discharged gas flow path comprises a first discharged gas flow path along which a part of the discharged gas from the combustor is guided to the cathode heat exchanger, and a second discharged gas flow path along which a remaining part of the discharged gas from the combustor is guided to the reformer, wherein:
the combustor includes a first catalyst combustor configured to combust the off-gas, and a vaporizer configured to vaporize a raw fuel by exchanging heat with the discharged gas generated by the first catalyst combustor, and supply a vaporized fuel to a flow path portion of the combustor; and
the manifold comprises a second catalyst combustor located in the discharged gas flow path and configured to combust a discharged gas flowing into the manifold through the vaporizer.

2. The fuel cell system according to claim 1, wherein:
the second catalyst combustor is located in each of the first and second discharged gas flow paths.

3. The fuel cell system according to claim 2, wherein:
a size of the second catalyst combustor disposed in the first discharged gas flow path and a size of the second catalyst combustor disposed in the second discharged gas flow path are different from each other.

4. The fuel cell system according to claim 2, wherein:
a plurality of the second catalyst combustors are respectively disposed in the first discharged gas flow path and the second discharged gas flow path, and
a number of the second catalyst combustors disposed in the first discharged gas flow path and a number of the second catalyst combustors disposed in the second discharged gas flow path are different from each other.

5. The fuel cell system according claim 1, wherein:
the second catalyst combustor includes a carrier in which a plurality of flat plates are arranged so as to be parallel to a gas flow direction, and a catalyst supported on the carrier.

6. The fuel cell system according to claim 1, wherein:
the second catalyst combustor includes a carrier as a tubular honeycomb structure, and a catalyst supported on the carrier.

7. The fuel cell system according to claim 1, further comprising:
a supply pipe configured to supply the raw fuel to the second catalyst combustor in the manifold.

8. The fuel cell system according to claim 7, wherein:
the supply pipe is attached to the manifold in a state in which a tip portion thereof is inserted into the manifold, and
the tip portion includes a plurality of fuel supply ports along a pipe extension direction.

9. The fuel cell system according to claim 8, wherein:
the plurality of fuel supply ports are disposed such that the raw fuel is supplied toward downstream of the discharged gas flow path.

10. The fuel cell system according to claim 1, wherein:
the manifold further includes an anode flow path along which the anode gas generated by the reformer is supplied to the fuel cell, and
in a width direction of the manifold, the off-gas flow path is located on one end side of the manifold, the anode flow path is located on the other end side of the manifold, and the discharged gas flow path is located between the off-gas flow path and the anode flow path.

11. The fuel cell system according to claim 10, wherein:
the manifold further includes a cathode flow path along which the cathode gas heated by the cathode heat exchanger is supplied to the fuel cell, and in a direction orthogonal to the width direction, the cathode flow path is located between the first discharged gas flow path and the second discharged gas flow path.

12. The fuel cell system according to claim 10, wherein:
on an end surface of the manifold on a side where the fuel cell is disposed, a portion facing the cathode flow path is formed as a protruding portion protruding toward the fuel cell, and the protruding portion is formed with a supply port through which the cathode gas is supplied to the fuel cell.

* * * * *